United States Patent
Monroe

(10) Patent No.: US 7,539,357 B1
(45) Date of Patent: *May 26, 2009

(54) METHOD AND APPARATUS FOR SENDING AND RECEIVING FACSIMILE TRANSMISSIONS OVER A NON-TELEPHONIC TRANSMISSION SYSTEM

(76) Inventor: David A. Monroe, 7800 IH 10 West, San Antonio, TX (US) 78230

( * ) Notice: Subject to any disclaimer, the term of this patent is extended or adjusted under 35 U.S.C. 154(b) by 0 days.

This patent is subject to a terminal disclaimer.

(21) Appl. No.: 09/374,136

(22) Filed: Aug. 10, 1999

Related U.S. Application Data

(63) Continuation of application No. 08/815,026, filed on Mar. 14, 1997, now Pat. No. 5,943,140.

(51) Int. Cl.
*G06K 9/60* (2006.01)
*H04N 1/32* (2006.01)

(52) U.S. Cl. .................................. 382/305; 358/400

(58) Field of Classification Search ................ 382/305; 358/1.15, 400, 411, 434, 440, 442, 457, 476, 358/508; 379/93.26, 100.17; 380/18; 455/557
See application file for complete search history.

(56) References Cited

U.S. PATENT DOCUMENTS

| | | | |
|---|---|---|---|
| 4,163,283 A | 7/1979 | Darby | |
| 4,179,695 A | 12/1979 | Levine et al. | |
| 4,197,536 A | 4/1980 | Levine | |
| 4,516,125 A | 5/1985 | Schwab et al. | |
| 4,652,933 A * | 3/1987 | Koshiishi | 358/443 |
| 4,831,438 A | 5/1989 | Bellman, Jr. et al. | |
| 4,845,629 A | 7/1989 | Murge | |
| 4,857,912 A | 8/1989 | Everett, Jr. et al. | |
| 4,884,132 A | 11/1989 | Morris et al. | |
| 4,891,650 A | 1/1990 | Sheffer | |
| 4,910,692 A | 3/1990 | Outram | |
| 4,937,676 A | 6/1990 | Finelli et al. | |
| 4,942,477 A | 7/1990 | Nakamura | |
| 5,027,114 A | 6/1991 | Kawashima et al. | |
| 5,091,780 A | 2/1992 | Pomerieau | |
| 5,109,278 A | 4/1992 | Erickson | |
| 5,111,291 A | 5/1992 | Erickson | |

(Continued)

FOREIGN PATENT DOCUMENTS

EP  220.752  5/1987

(Continued)

OTHER PUBLICATIONS

Apr. 1966, Apollo Unified S-Band System, NASA-Goddard Space Flight Center, Greenbelt, Maryland.

Nov. 24, 19976, TELEXIS ViaNet General Information Booklet Version 1.3.

(Continued)

*Primary Examiner*—Kanji Patel

(57) ABSTRACT

An interface is provided for connecting a standard telephone line and/or a standard facsimile machine with a distributive communication network interface such as a personal computer, whereby facsimile signal present on the telephone line or at the facsimile machine may be transmitted via the Internet to a remote station without the use of long distance or international telephone signal carriers. The facsimile signal may be sent or received via the network using the network, without interfering with the capability to receive and send facsimile signals in the normal manner via a standard telephone line.

12 Claims, 10 Drawing Sheets

U.S. PATENT DOCUMENTS

| | | | |
|---|---|---|---|
| 5,166,746 A | 11/1992 | Sato et al. | |
| 5,193,012 A | 3/1993 | Schmidt | |
| 5,218,367 A | 6/1993 | Sheffer et al. | |
| 5,235,432 A | 8/1993 | Creedon et al. | |
| 5,243,340 A | 9/1993 | Norman et al. | |
| 5,243,530 A | 9/1993 | Stanifer et al. | |
| 5,268,698 A | 12/1993 | Smith, Sr. et al. | |
| 5,283,643 A | 2/1994 | Fujimoto | |
| 5,321,615 A | 6/1994 | Frisbie et al. | |
| 5,327,487 A * | 7/1994 | Brown et al. | 379/100.17 |
| 5,334,982 A | 8/1994 | Owen | |
| 5,351,194 A | 9/1994 | Rose et al. | |
| 5,400,031 A | 3/1995 | Fitts | |
| 5,408,330 A | 4/1995 | Squicciarini et al. | |
| 5,432,838 A | 7/1995 | Purchase | |
| 5,440,337 A | 8/1995 | Henderson et al. | |
| 5,440,343 A | 8/1995 | Parulski | |
| 5,440,619 A * | 8/1995 | Cann | 379/93.11 |
| 5,448,243 A | 9/1995 | Bethke et al. | |
| 5,463,595 A | 10/1995 | Rodhall et al. | |
| 5,469,371 A | 11/1995 | Bass | |
| 5,497,149 A | 3/1996 | Fast | |
| 5,508,736 A | 4/1996 | Cooper | |
| 5,509,009 A | 4/1996 | Laycock | |
| 5,530,440 A | 6/1996 | Danzer et al. | |
| 5,530,558 A * | 6/1996 | Nachman | 358/442 |
| 5,553,609 A | 9/1996 | Chen et al. | |
| 5,557,254 A | 9/1996 | Johnson et al. | |
| 5,557,278 A | 9/1996 | Piccirillo et al. | |
| 5,577,108 A * | 11/1996 | Mankovitz | 379/93.26 |
| 5,590,339 A * | 12/1996 | Chang | 713/310 |
| 5,598,167 A | 1/1997 | Zijderhand | |
| 5,612,668 A | 3/1997 | Scott | |
| 5,627,753 A | 5/1997 | Brankin et al. | |
| 5,629,691 A | 5/1997 | Jain | |
| 5,636,122 A | 6/1997 | Shah et al. | |
| 5,642,285 A | 6/1997 | Woo | |
| 5,666,157 A | 9/1997 | Aviv | |
| 5,670,961 A | 9/1997 | Tomota et al. | |
| 5,677,979 A | 10/1997 | Squicciarini | |
| 5,689,442 A | 11/1997 | Swanson et al. | |
| 5,712,679 A | 1/1998 | Coles | |
| 5,712,899 A | 1/1998 | Pace, II | |
| 5,714,948 A | 2/1998 | Farmakis et al. | |
| 5,737,454 A * | 4/1998 | Park et al. | 382/284 |
| 5,742,336 A | 4/1998 | Lee | |
| 5,751,346 A | 5/1998 | Dozier | |
| 5,751,442 A * | 5/1998 | Hamada et al. | 358/442 |
| 5,777,580 A | 7/1998 | Hess | |
| 5,790,640 A * | 8/1998 | Tassa et al. | 379/100.15 |
| 5,793,416 A | 8/1998 | Rostoker et al. | |
| 5,793,498 A * | 8/1998 | Scholl et al. | 358/434 |
| 5,825,283 A | 10/1998 | Camhi | |
| 5,835,059 A | 11/1998 | Nadel et al. | |
| 5,848,413 A * | 12/1998 | Wolff | 707/10 |
| 5,850,180 A | 12/1998 | Hess | |
| 5,861,959 A * | 1/1999 | Barak | 358/403 |
| 5,867,804 A | 2/1999 | Pilley et al. | |
| 5,872,845 A * | 2/1999 | Feder | 380/18 |
| 5,917,405 A | 6/1999 | Joao | |
| 5,926,210 A | 7/1999 | Hackett et al. | |
| 5,933,098 A | 8/1999 | Maxton | |
| 5,936,706 A | 8/1999 | Feldman | |
| 5,936,743 A * | 8/1999 | Satoh | 358/434 |
| 5,938,706 A | 8/1999 | Feldman | |
| 5,974,158 A | 10/1999 | Auty et al. | |
| 5,983,161 A | 11/1999 | Lemelson et al. | |
| 5,991,052 A * | 11/1999 | Hobo | 358/457 |
| 5,999,116 A | 12/1999 | Evers | |
| 6,002,427 A | 12/1999 | Kipust | |
| 6,009,356 A | 12/1999 | Monroe | |
| 6,067,172 A * | 5/2000 | Yokoyama | 358/442 |
| 6,067,571 A | 5/2000 | Igarashi et al. | |
| 6,069,655 A | 5/2000 | Seeley | |
| 6,078,850 A | 6/2000 | Kane et al. | |
| 6,084,510 A | 7/2000 | Lemelson et al. | |
| 6,092,008 A | 7/2000 | Bateman | |
| 6,100,964 A | 8/2000 | De Cremiers | |
| 6,133,941 A | 10/2000 | Ono | |
| 6,154,658 A | 11/2000 | Caci | |
| 6,157,317 A | 12/2000 | Walker | |
| 6,157,846 A * | 12/2000 | Manning et al. | 455/557 |
| 6,181,373 B1 | 1/2001 | Coles | |
| 6,195,609 B1 | 2/2001 | Pilley et al. | |
| 6,226,031 B1 | 5/2001 | Barraclough et al. | |
| 6,246,320 B1 | 6/2001 | Monroe | |
| 6,259,475 B1 | 7/2001 | Ramachandran et al. | |
| 6,275,231 B1 | 8/2001 | Obradovich | |
| 6,278,965 B1 | 8/2001 | Glass et al. | |
| 6,282,488 B1 | 8/2001 | Castor et al. | |
| 6,292,098 B1 | 9/2001 | Ebata | |
| 6,356,625 B1 | 3/2002 | Casteiani | |
| 6,385,772 B1 | 5/2002 | Courtney | |
| 6,424,370 B1 | 7/2002 | Courtney | |
| 6,437,873 B1 * | 8/2002 | Maeda | 358/1.15 |
| 6,462,697 B1 | 10/2002 | Klamer et al. | |
| 6,476,858 B1 | 11/2002 | Ramirez Diaz et al. | |
| 6,504,479 B1 | 1/2003 | Lemons | |
| 6,522,352 B1 | 2/2003 | Liao et al. | |
| 6,525,761 B2 | 2/2003 | Sato et al. | |
| 6,549,130 B1 | 4/2003 | Joso | |
| 6,556,241 B1 | 4/2003 | Yoshimura et al. | |
| 6,570,610 B1 | 5/2003 | Kipust | |
| 6,628,835 B1 | 9/2003 | Brill | |
| 6,646,576 B1 | 11/2003 | DeGrace | |
| 6,662,649 B1 | 12/2003 | Knight et al. | |
| 6,675,386 B1 | 1/2004 | Hendricks et al. | |
| 6,698,021 B1 | 2/2004 | Amini | |
| 6,720,990 B1 | 4/2004 | Walker et al. | |
| 7,111,971 B2 | 9/2006 | Ohi et al. | |
| 7,113,971 B1 | 9/2006 | Ohi et al. | |
| 2003/0071899 A1 | 4/2003 | Joso | |
| 2005/0055727 A1 | 3/2005 | Creamer et al. | |
| 2005/0056727 A1 | 3/2005 | Creamer et al. | |
| 2005/0138083 A1 | 6/2005 | Rasteger | |

FOREIGN PATENT DOCUMENTS

| | | |
|---|---|---|
| EP | 232031 | 8/1987 |
| EP | 209.397 | 7/1993 |
| EP | 613109 | 8/1994 |
| EP | 613110 | 8/1994 |
| EP | 613111 | 8/1994 |
| EP | 532110 | 3/1996 |
| EP | 744630 | 11/1996 |
| EP | 785.536 | 7/1997 |
| JP | 6-301898 | 10/1994 |
| JP | 9-282600 | 10/1997 |
| JP | 10-66058 | 3/1998 |
| JP | HEI-10-66058 | 3/1998 |
| JP | A-10-155040 | 6/1998 |
| JP | 9-251599 | 4/1999 |
| JP | 11-160424 | 6/1999 |
| WO | WO90/04242 | 4/1990 |
| WO | WO95/27910 | 10/1995 |
| WO | WO96/12265 | 4/1996 |
| WO | WO97/37336 | 10/1997 |
| WO | WO98/52174 | 11/1998 |

OTHER PUBLICATIONS

2000, ViaNet 3000 Administrator's Manual Version 1.1-NetXpress Video by TELEXIS, Kanata, Ontario, Canada.

1999, ViaNet 3000 Operator Manual Version 1.0 by TELENIS-NetXpress Video, Kanta, Ontario, Canada.

1999, viaNet 3000 Administrator Manual Version 1.0-NetXpress Video by TELEXIS, Kanata, Ontario, Canada.

1999, ViaNet 3000 Instruction Manual Operator's Revision 1-NetXpress Video by TELEXIS, Kanata, Ontario, Canada.

Rettig, Hillary; Fax The Web!; VARBusiness www.varbiz.com, Jul. 15, 1996, p. 47 (copy attached).

* cited by examiner

METHOD AND APPARATUS FOR SENDING AND RECEIVING FACSIMILE TRANSMISSIONS OVER A NON-TELEPHONIC TRANSMISSION SYSTEM

This is a continuation of U.S. patent application Ser. No. 09/374,136 filed Aug. 10, 1999, which is hereby incorporated by reference.

BACKGROUND OF THE INVENTION

1. Field of the Invention

The subject invention is generally related to facsimile transmission of documents, commonly known as fax systems, and is specifically directed to a fax system for sending documents and printed materials via distributive communication networks such as, by way of example, the Internet.

2. Discussion of the Prior Art

Facsimile transmission of documents and printed matter is well known. In a typical application, the document is fed through a transmission machine, where the printed or graphic material on the hard document is converted into a digital signal. This signal is then transmitted in real time over a telephone line to a compatible receiving machine where it is decoded and a facsimile document is reproduced.

Over the years, numerous changes have been made in this basic concept to improve both the quality and the efficiency of the transmission. Most receiving units still record and encode the information on a line-by-line feed. Others store the entire document code prior to initiating transmission and store the entire received document prior to reproduction. Still other systems utilize memory capacity to permit storage of the documents during normal business hours for transmission during off hours. Large volume users have incorporated comprehensive data compression and reduction schemes in order to reduce the amount of data required to be transmitted.

All of these various improvements have been made to reduce the amount of on-line time per transmission. Since transmission is almost always via public telephone lines, both congestion and expense are issues. This is particularly true when transmitting documents over domestic long distance lines or international telephone systems. Enormous savings could be achieved by a facsimile transmission system which is not dependent upon long distance and international public telephone lines.

SUMMARY OF THE INVENTION

The subject invention is directed to a facsimile transmission system which does not require the use of long distance or international telephone systems in order to transmit documents over long distances. Instead the "fax" system of the present invention utilizes the Internet, permitting fax transmission via local telephone service and Internet communication, or, in the alternative, directly over a network system without use of public access communication lines such as telephonic systems.

In the preferred embodiment, the fax system is also fully compatible with prior art systems and can send and receive documents via telephone lines as well as via other distributive communication networks such as, by way of example, the Internet. One significant advantage of the system of the subject invention is the ability to incorporate printed documents and graphic material, as well as computer generated documents and graphic material, into the fax system.

While the most significant advantage of the network fax system of the subject invention is the elimination of the use of costly public telephone carriers, the overall versatility of the system provides additional advantages over the prior art. For example, documents faxed into the system via prior art telephonic systems can be readily re-transmitted over the Internet. Likewise, documents transmitted over the Internet in the well known manner, e.g., E-mail, can be converted and retransmitted via prior art telephonic fax systems.

In addition, the network fax system of the subject invention can serve as an economical scanner, converting hard documents and graphic material into machine readable digital code which can then be transmitted directly into a computer based system for reformatting in a word processing system and the like. Likewise, the information in the computer system can be decoded and printed at the fax machine.

The versatility provided by the method and apparatus of the subject invention permits a common fax machine to become a printer and a scanner, as well as an interface to the distributive networks. This permits stations not on the network to communicate with the network via facsimile document transmission and permits the network users to communicate with the remote station.

All of this can be accomplished utilizing standard local telephone hookup between a user station and the network, permitting worldwide communication via a network such as the Internet without the use of long distance and international telephonic carriers.

The heart of the system of the subject invention is an interface positioned intermediately of a standard telephone line, a fax machine, and a computer. The interface is software supported at the computer and is adapted to route the signals therethrough to the computer for storage or for transmission via a selected network, or over a standard telephonic line, both to and from a standard fax machine.

In the preferred embodiment, the interface is inserted between the fax machine, the P.C., and the standard telephone line. The system is also adapted for use with other communication links and devices such as by way of example, ethernet, the world wide web and the like. The interface is also connected directly to a computer base such as a typical personal computer system, which permits communications between the network, the fax machine and the standard telephone system.

All of the software support for the system is loaded into the standard computer base. The interface permits the fax signal on the line between the public telephone system and the fax machine to be diverted to the computer where it is converted by the software into an acceptable Internet format. Signals from the Internet are converted into an acceptable fax format whereby they can be received by the local fax machine or transmitted over the standard telephone line to a remote fax system.

It is, therefore, an object and feature of the subject invention to provide a facsimile transmission system for permitting long distance fax transmission without the use of long distance or international telephone service.

It is a further object and feature of the subject invention to provide a facsimile transmission system that permits "faxed" documents to be transmitted and received via distributive data communication networks.

It is an additional object and feature of the subject invention to provide a facsimile transmission system which permits conversion of documents from any source into a computer into a standard facsimile format for transmission and reception via a standard facsimile transmission system.

Other objects and features of the invention will be readily apparent from the accompanying drawings and detailed description of the preferred embodiment.

DETAILED DESCRIPTION OF THE PREFERRED EMBODIMENT

Figure 1:
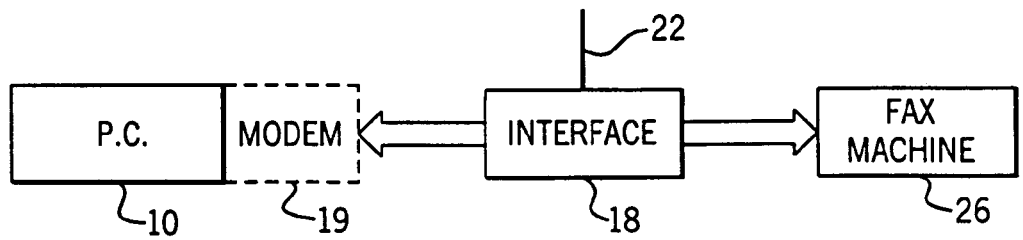
FIG. 1 is a flow diagram of a system incorporating the features of the subject invention.
Figure 2:
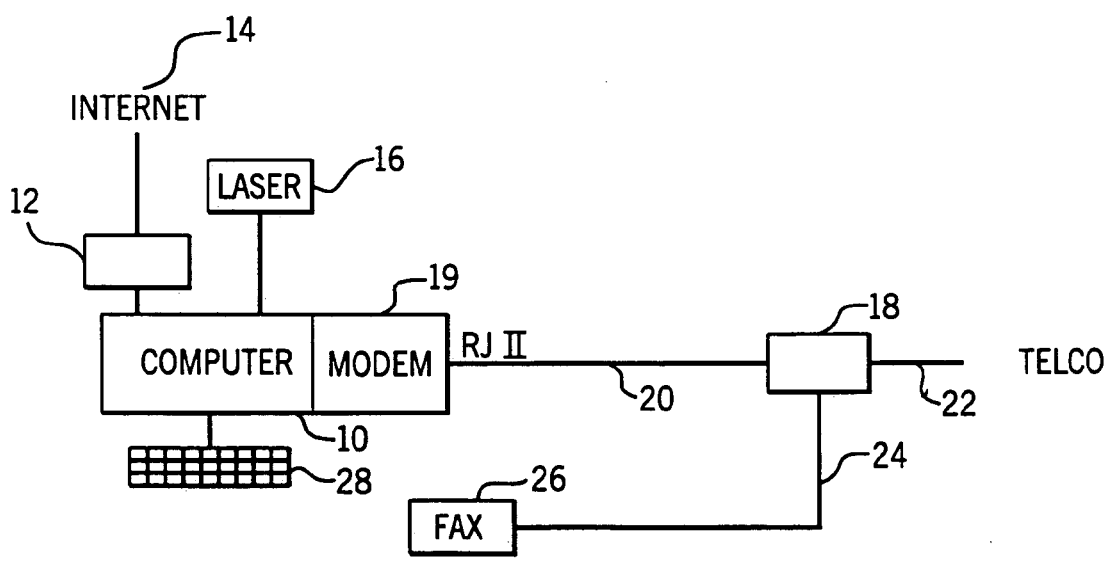
FIG. 2 is a diagrammatic view of the activation combinations of the interface of the subject invention.

As shown in FIG. 1, the subject invention is utilized in combination with a standard computer based system such as, by way of example, the personal computer 10. As is typical, the computer 10 is connected to a modem 19, which may be either internal or external as shown. In a typical application, the modem may be used to connect the computer system to a distributive network such as the Internet, as indicated at 14 (FIG. 2.) The network may also be wired directly into the computer, as is the case with LAN based systems and the like. The significant point is that the computer is adapted for communicating data over a distributive network system. Also as is typical, the computer system may include any of a plurality of options, desired peripheral hardware components such as, by way of example, the laser printer 16 (FIG. 2.)

In the preferred embodiment, one of the serial/parallel ports of the computer is connected to the facsimile communication interface 18 of the subject invention via a dedicated cable 20. In the illustrated embodiment, the interface 18 is connected directly to a standard local service telephone line 22 and via a dedicated communication line 24 to a standard, off-the-shelf facsimile machine 26. The only additional hardware for the system of the subject invention is the interface 18, and the dedicated cable 20. A second phone wire 24 may also be required. The heart of the system is software which is loaded directly into the system via the computer 10, in typical fashion, utilizing a floppy disk or a CD ROM.

In order to operate the system of the subject invention, the software is utilized to convert the signal on line 20 received from the facsimile machine 26 from a standard facsimile signal such as, by way of example, a Group III signal, to a signal which is recognizable and useable by the computer system. Conversely, data signals output by the computer may be converted to Group III data signals, or the like for reproduction at the facsimile machine.

The data signal on line 20 may then be adapted for on-line transmission via the a distributive network such as the Internet 14 or for other computer based manipulation systems such as word processing and the like. The software also converts signals incoming directly to the computer via the Internet, a scanner (not shown), the keyboard 28, or other input device into a facsimile compatible signal for transmission over cable 20 and through the interface switch 18 to the fax machine 26 and/or the line 22 as a fax signal.

FIG. 2 is a diagrammatic view showing the switching combinations made possible by the interface of the subject invention. In graphic 30 FIG. 3A, the fax signal transmitted to/from the computer via cable 20 is sent/received directly over the telephone line 22 in communication with a remote facsimile receiver. In graphic 32 FIG. 3B, the same signal is sent/received by a local facsimile receiver 26 (FIG. 1) via line 24.

Figure 3A:
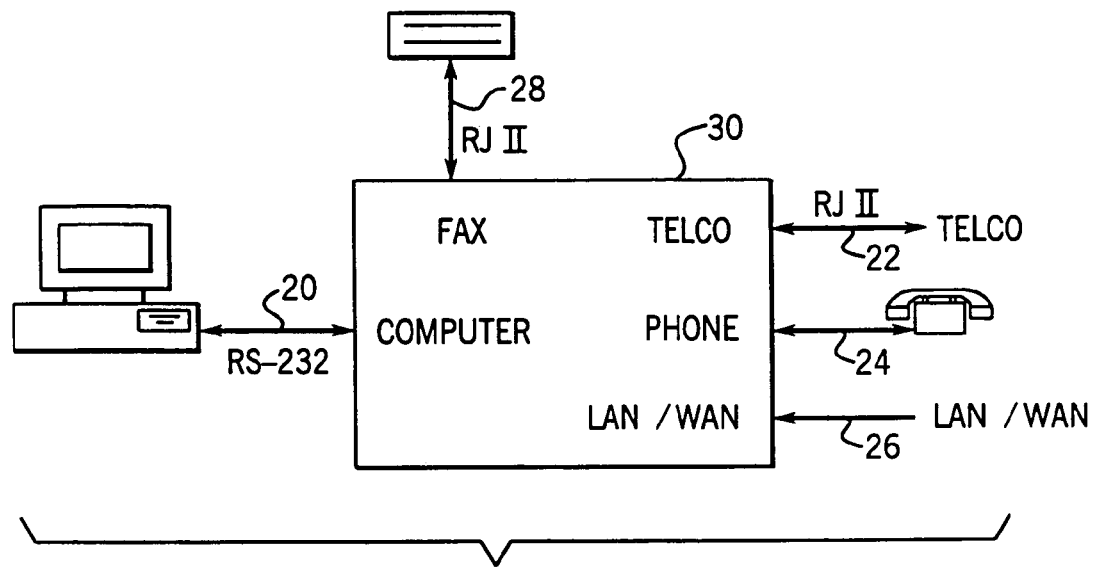
FIGS. 3A-3Q are a more detailed flow diagram of the interface in accordance with the subject invention.
Figure 3B:
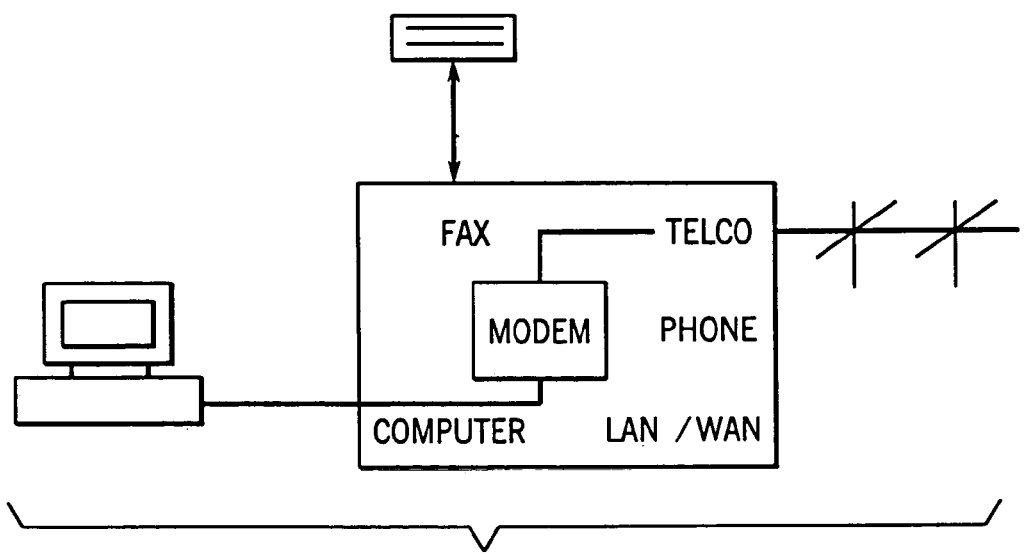
Figure 3C:
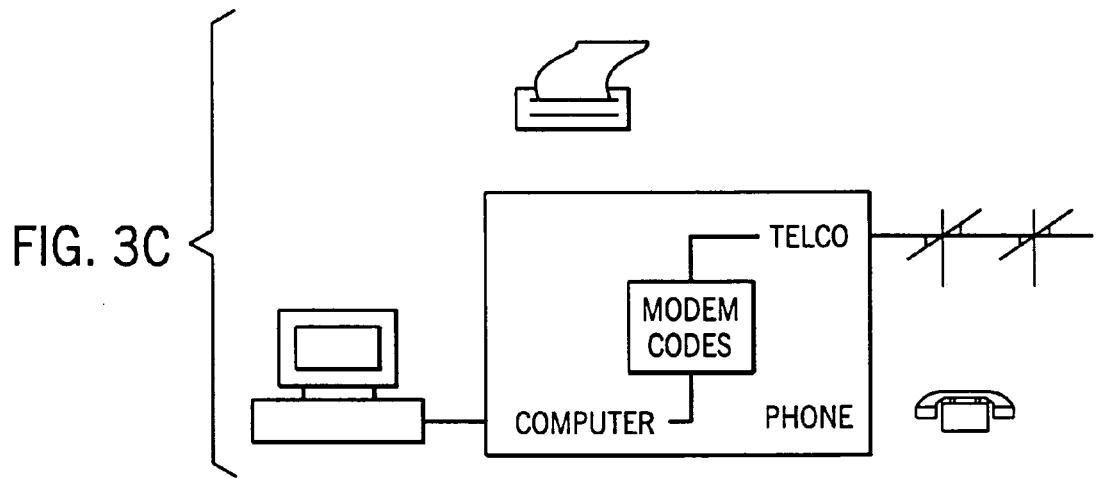
Figure 3D:
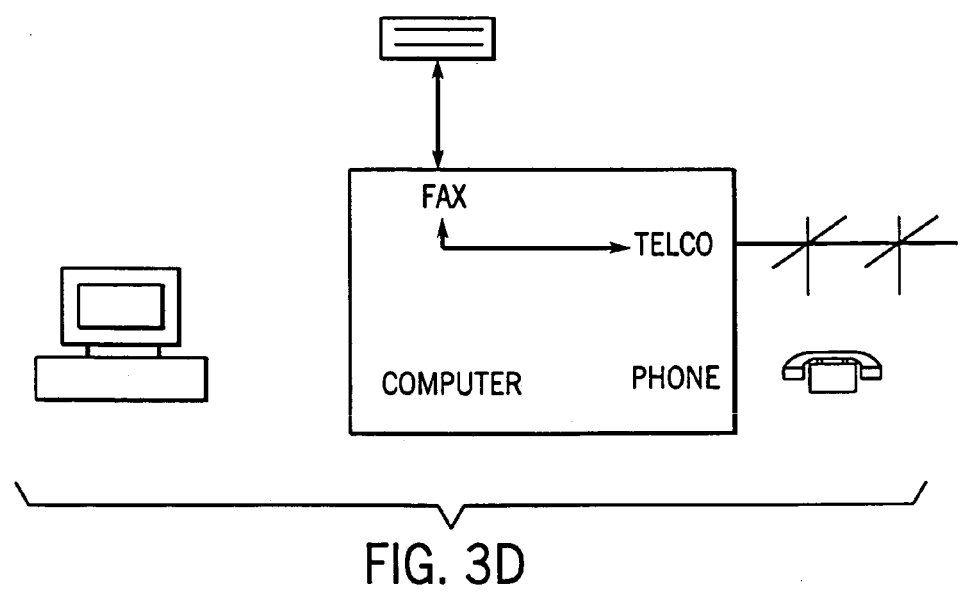
Figure 3E:
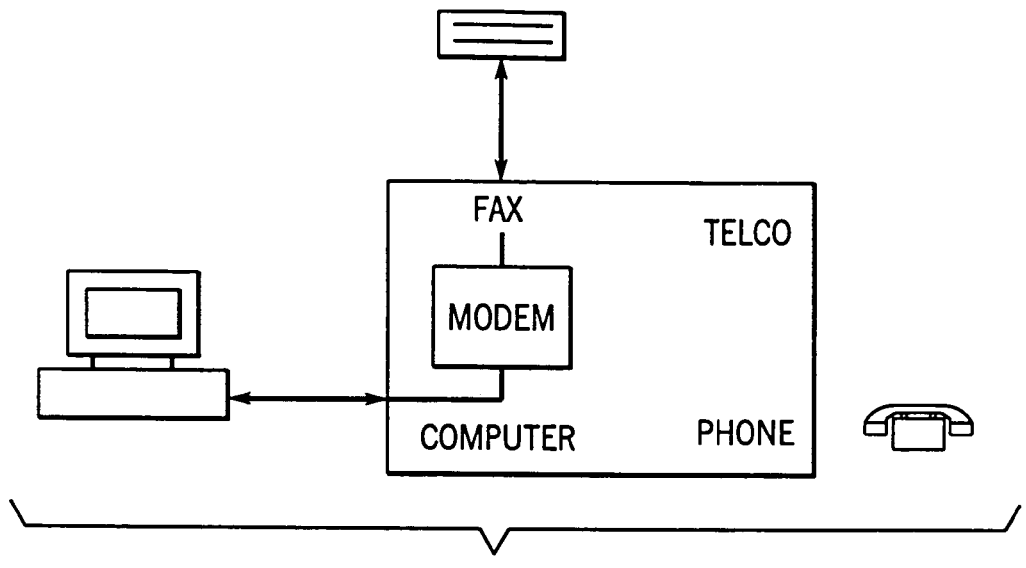
Figure 3F:
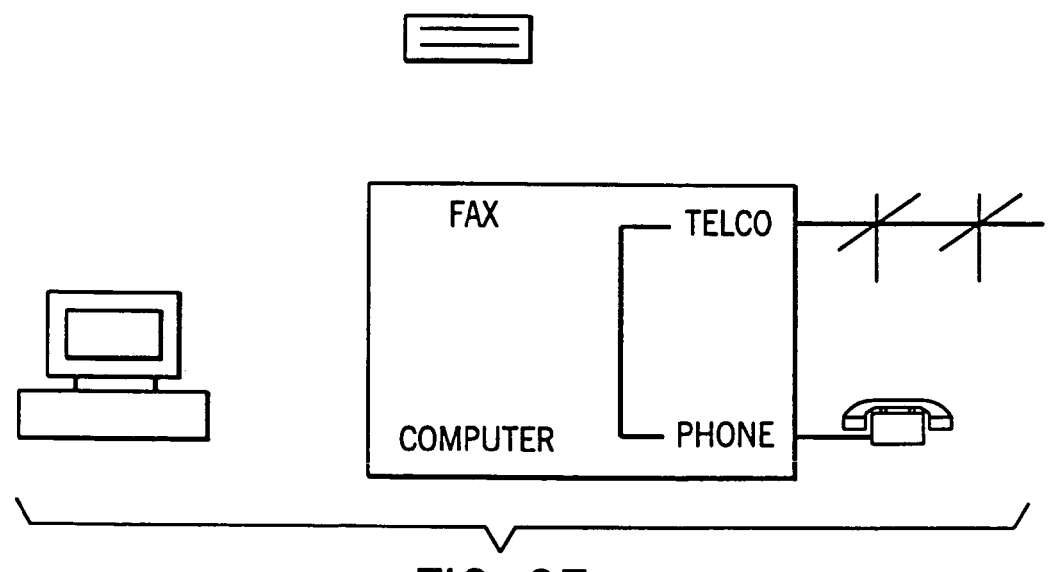
Figure 3G:
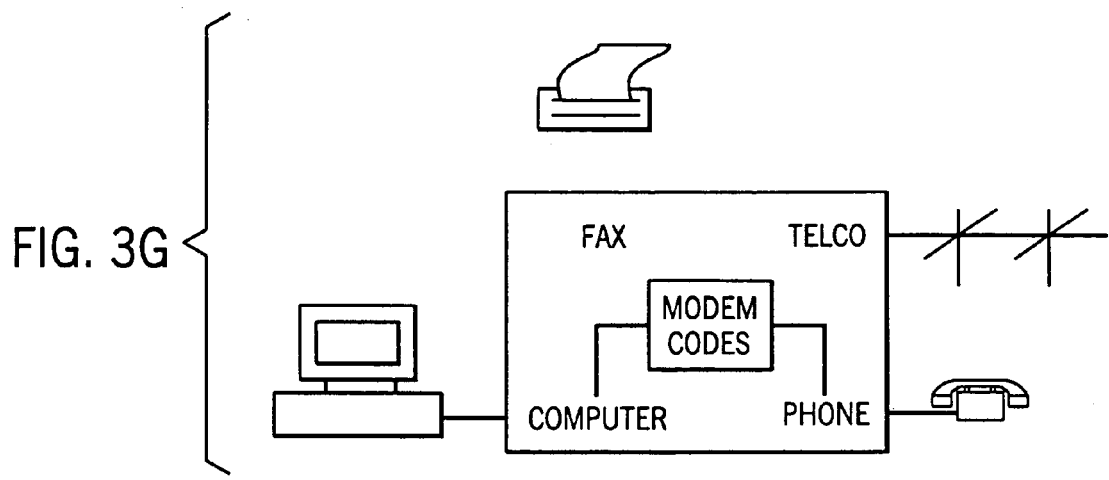
Figure 3H:
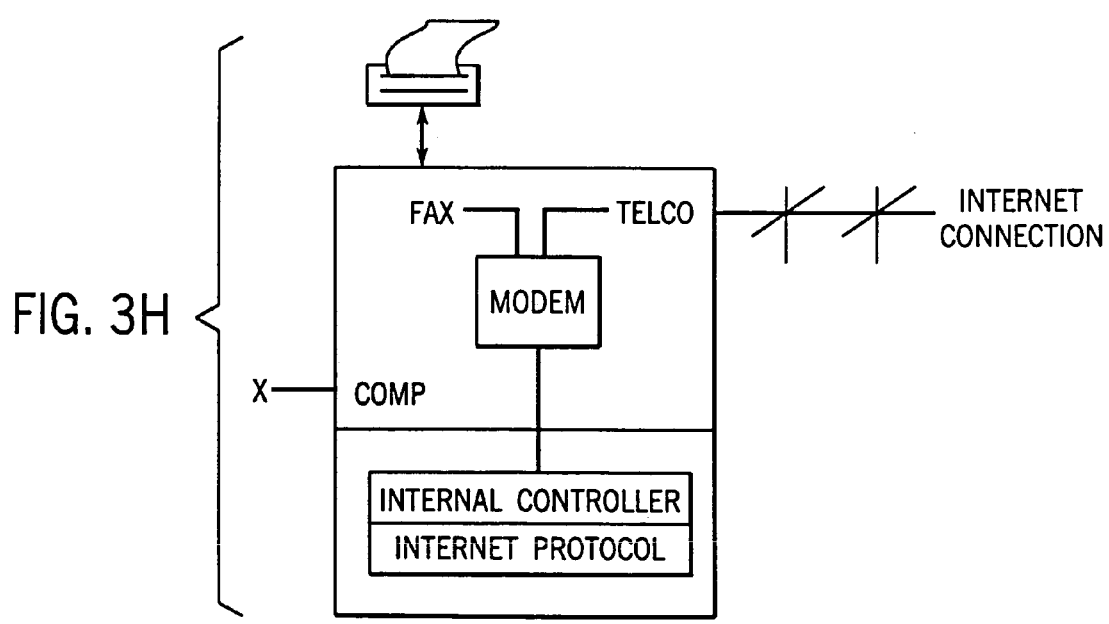
Figure 3I:
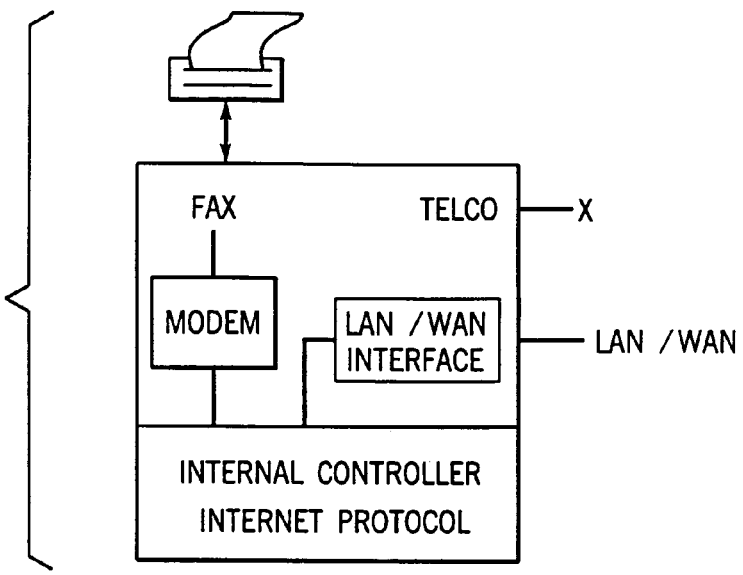
Figure 3J:
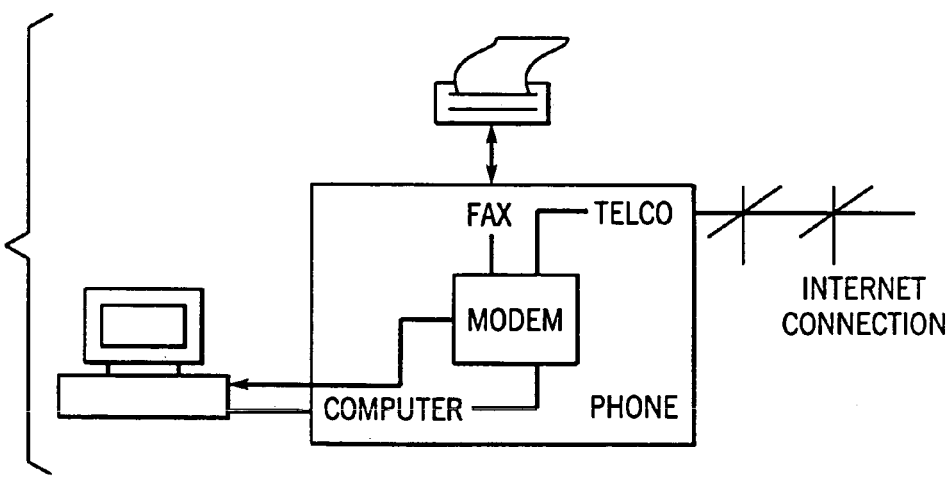
Figure 3K:
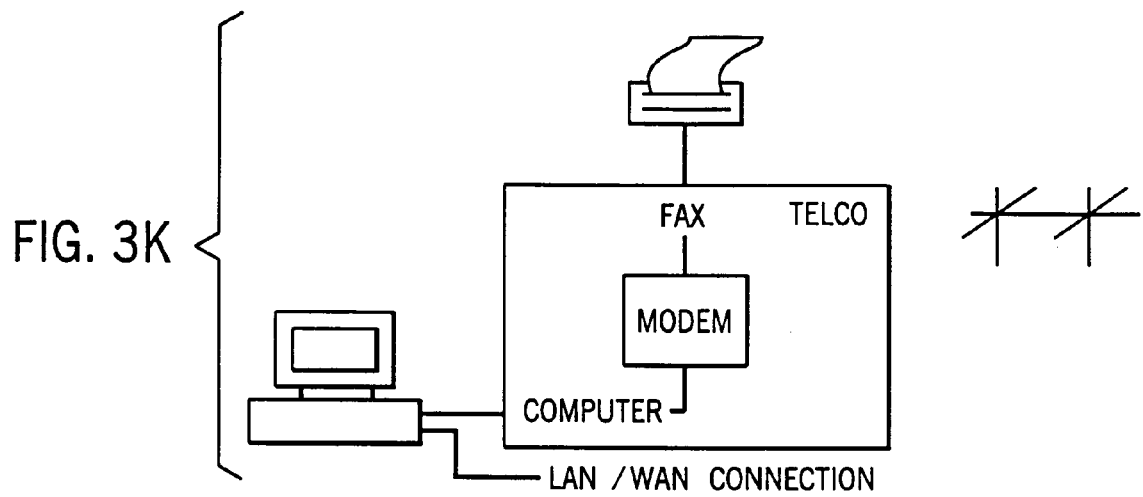
Figure 3L:
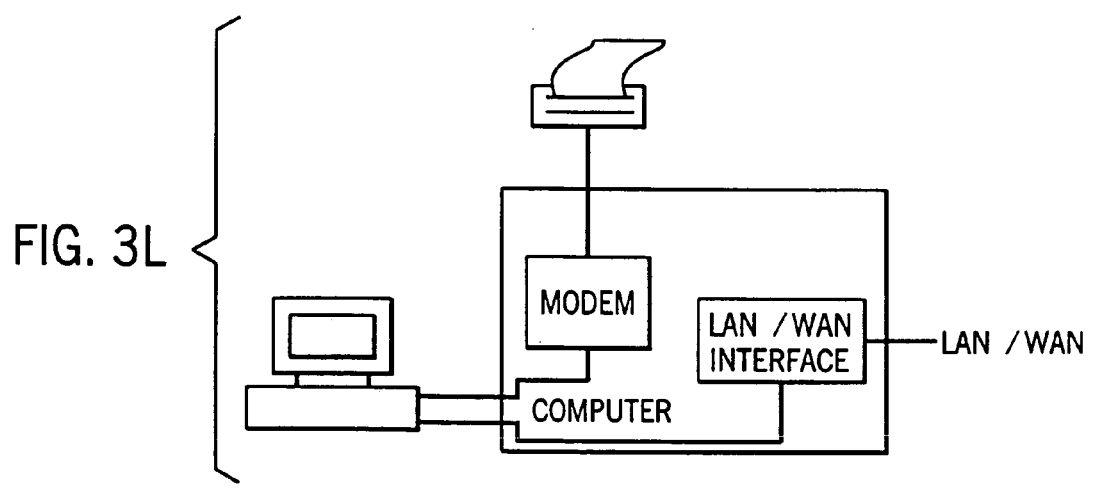
Figure 3M:
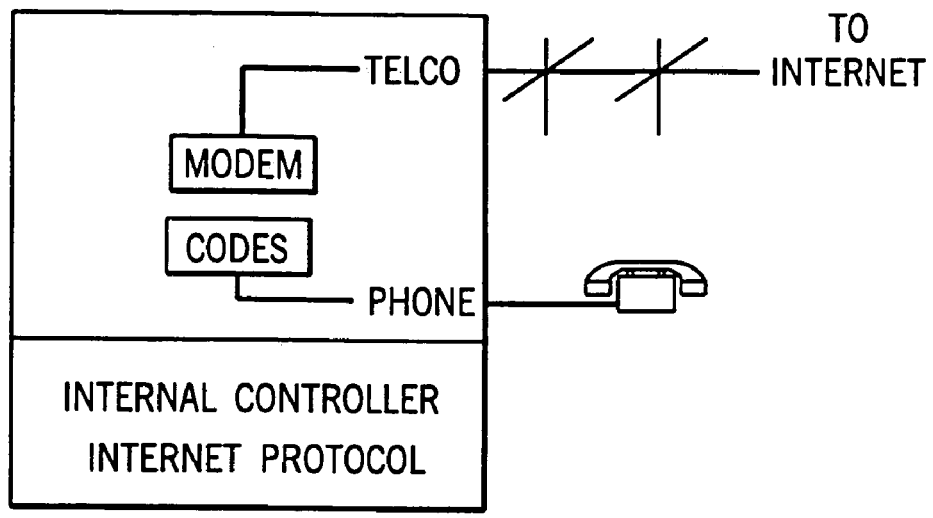
Figure 3N:
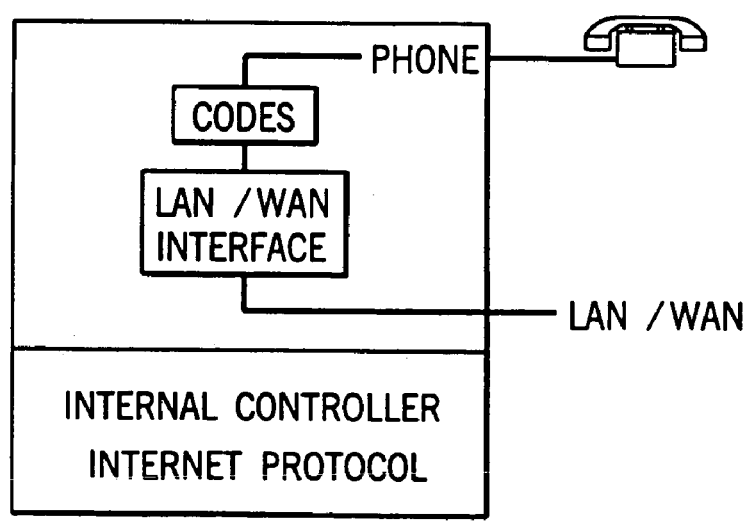
Figure 3:
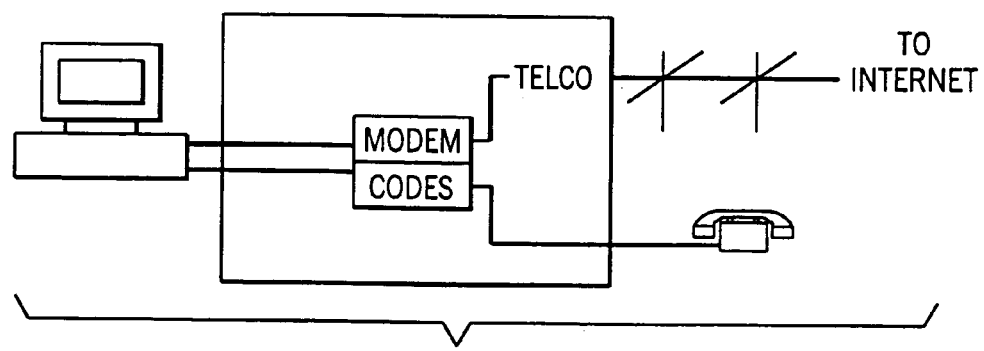
Figure 3P:
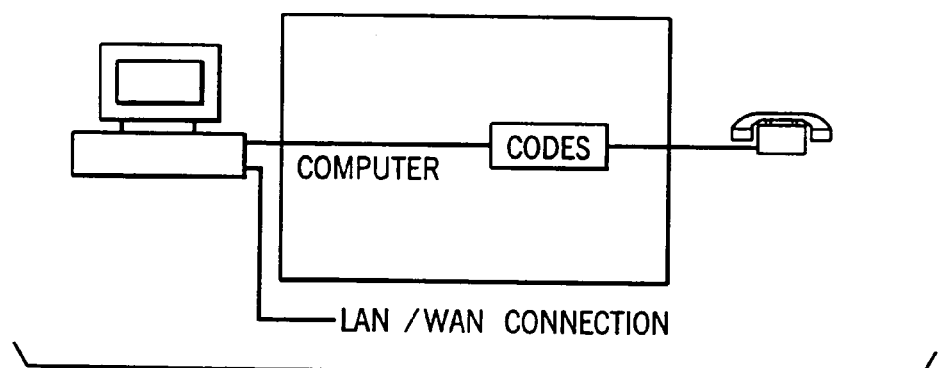
Figure 3Q:
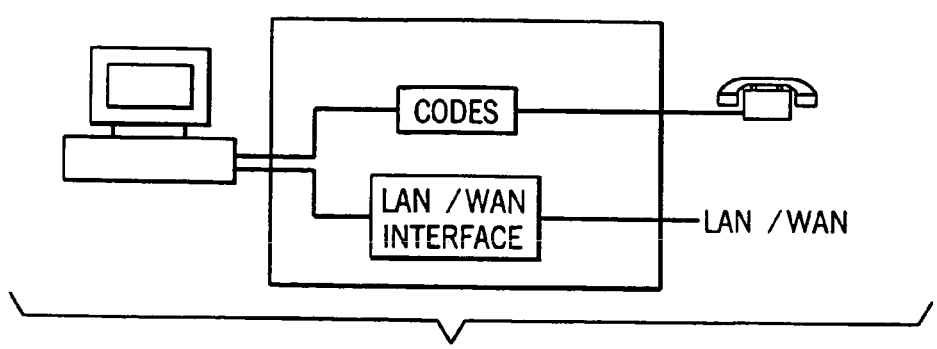

In graphic 34 FIG. 3D, the local facsimile machine is in a normal operating mode and communicates directly with a telephone line 22.

Figure 4:
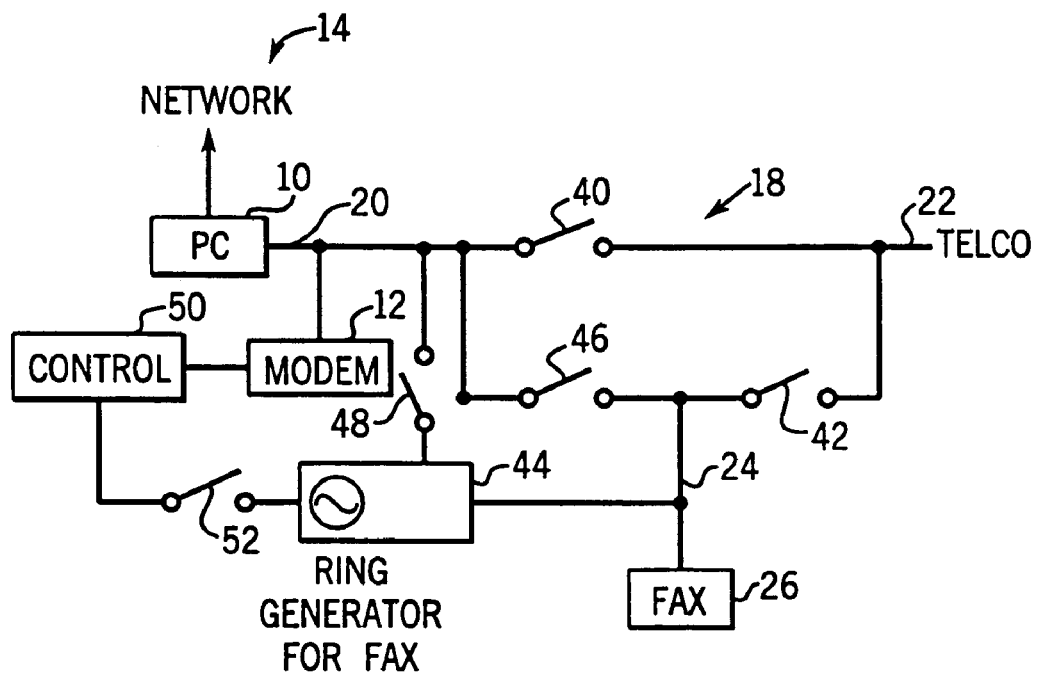
FIG. 4 is an alternative embodiment, similar to FIG. 3.
Figure 5:
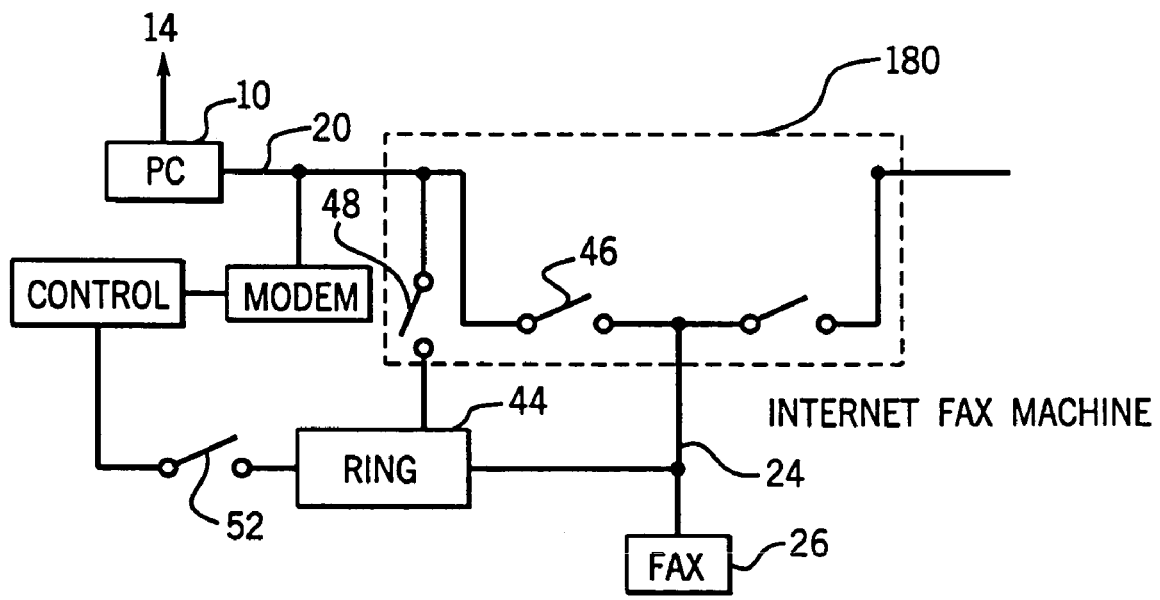
FIG. 5 is an alternative embodiment, similar to FIG. 3.

A more detailed diagram of the interface 18 is shown in FIG. 4. The telephone line 22 is in direct communication with a pair of switches 40, 42, provided in the interface 18. When switch 40 is closed, the telephone line is connected directly to the computer via cable 20. When switch 42 is closed, the telephone line is connected directly to the local facsimile machine via line 24. This line is also connected to a "ring" generator 44 to signal an incoming fax. The ring generator provides am activation signal for initiating the facsimile machine when a standard incoming telephone "ring" signal is not present. The ring generator 44 communicates directly with the computer via cable 20 directly with the local facsimile machine 26 via the interface 18. A parallel switch 48 is also present to selectively initiate the ring generator. Where desired, cable 20 can also be connected directly to the modem and through a controller 50 to a switch 52 and to the ring generator 44 to signal an incoming fax directly from the network.

As more specifically shown in FIG. 4, the system of the present invention is adapted for converting any of a variety of computer generated data signals to a facsimile format, and vise versa. For example, a data signal received by the computer 10 from a network source 14 is output on cable 20 and introduced directly to a local facsimile machine 26 via interface 18. The ring generator 44 will activate the facsimile machine by providing a simulated "ring" signal. Conversely, the local facsimile machine 26 may be used to receive hard copy data and via the interface 18 and dedicated cable 20, introduce the data into the computer 10 for transmission over a network line 14.

The telephone hook-up 22 shown in FIG. 3A is used when a remote facsimile machine is communicating either directly with the facsimile machine 26 in the normal manner, or with the computer 10 for transmission over the selected distributive network.

The facsimile system of the subject invention is very versatile in that it permits the local fax machine 26 to selectively transmit inputted and scanned documents to remote fax systems via telephone line 22, to the computer for processing via cable 20 and to remote fax locations via the Internet 14. The local facsimile machine becomes an inexpensive scanner source for scanning documents directly into the computer. The system of the subject invention also permits documents received via the Internet (whether originating as facsimile transmissions, E-mail or other) or documents generated at the computer or direct facsimile transmissions via telephone line 22 to be printed directly at the local facsimile machine 26, potentially eliminating the need for a separate printer 16.

The facsimile interface and transmission system of the subject invention is an efficient method and apparatus for transmitting and receiving documents via the distributive communication networks such as the Internet as well as via direct computer communication and standard fax transmission, without requiring the use of additional peripheral hardware components. While certain features and embodiments of the invention have been described in detail herein, it will be readily understood that the invention encompasses all modifications and enhancements with the scope and spirit of the following claims.

What is claimed is:

1. A facsimile transmitting/receiving system comprising a standard facsimile machine and a computer based system in communication with said standard facsimile machine, the system comprising:

an interface positioned immediately of and in communication with both said facsimile machine and said computer based system;

a line for receiving and sending facsimile signals in communication with said interface for selectively communicating directly with said facsimile machine and said computer;

means for converting encoded documents to formats compatible with computer supported systems and with said facsimile machine;

wherein said means is further adopted for converting facsimile signals to a format for transmission over distributive communication networks and for converting network transmitted signals in a format for transmission over a facsimile transmission line; and wherein said interface further comprises one or more switches for selectively controlling electronic communication between (1) said line and said computer based system and (2) said line and said facsimile machine.

2. The facsimile system of claim 1, wherein said interface further comprises a first switch operable between an open position and a closed position, wherein said first switch in said closed position allows direct communication between said line and said computer based system.

3. The facsimile system of claim 2, wherein said first switch in said open position prevents communication between said line and said computer based system.

4. The facsimile system of claim 2, wherein said interface further comprises a second switch operable between an open position and a closed position, wherein said second switch in said closed position allows direct communication between said line and said facsimile machine.

5. The facsimile system of claim 4, wherein said second switch in said open position prevent communication between said line and said computer based system.

6. The facsimile system of claim 4, wherein said line is in direct communication with both (1) said computer based system and (2) said facsimile machine when said first switch and said second switch are simultaneously in their respective closed positions.

7. The facsimile system of claim 1, further comprise a ring generator for initiating said facsimile machine.

8. The facsimile system of claim 7, further comprising a parallel switch for selectively activating said ring generator.

9. A facsimile machine adapted to be connected to an internet protocol communication channel to transmit to the internet protocol communication channel a transmission signal formatted according to internet protocol, the transmission signal formatted according to internet protocol including transmitted data representing a document to be transmitted, the facsimile machine comprising:

a facsimile component, the facsimile component outputting a facsimile signal, the facsimile signal representing the document, the facsimile signal being formatted according to a facsimile protocol;

a digital processing interface in communication with the facsimile component for receiving the facsimile signal, the digital processing interface being adapted to convert the facsimile signal from facsimile format to a processor formatted data signal, the processor formatted data signal being formatted according to a protocol compatible with operation of a digital processor, the processor formatted data signal including processor formatted data representing the document;

a network interface, the network interface being adapted to receive the processor formatted data, the network interface being adapted to convert the processor formatted data to the transmission signal formatted according to internet protocol, the network interface being adapted to transmit to the internet protocol communication channel the transmission signal formatted according to internet protocol.

10. A facsimile machine according to claim 9 and further comprising:

a processor and memory combination, the processor and memory combination being operable to perform at least one processing operation of at least one of the digital processing interface and the network interface.

11. A facsimile machine adapted to be connected to an internet protocol communication channel to receive from the internet protocol communication channel a received signal formatted in internet protocol format, the received signal formatted according to internet protocol format including received data representing a received document to be received from the internet protocol communication channel, the facsimile machine comprising:

a network interface, the network interface being adapted to receive from the internet protocol communication channel the received signal formatted in internet protocol, the network interface being adapted to convert the received signal formatted in internet protocol from internet protocol to a processor format, the processor format being a formatting protocol compatible with operation of a digital processor, the network interface thus being adapted to provide the received data in processor format;

a digital processing interface in communication with the network interface, the digital processing interface being adapted to receive the received data in processor format, the digital processing interface being adapted to convert the received data in processor format from the processor format to facsimile format, the digital processing interface thus being adapted to provide the received data formatted according to a facsimile protocol; and a facsimile component in communication with the digital processing interface for receiving the received data formatted according to facsimile protocol, the facsimile component being adapted to output a received facsimile signal formatted according to a facsimile protocol, the received facsimile signal including the received data formatted according to a facsimile protocol, the received data formatted according to a facsimile protocol thus representing the received document.

12. A facsimile machine according to claim 11 and further comprising:

a processor and memory combination, the processor and memory combination being operable to perform at least one processing operation of at least one of the digital processing interface and network interface.

\* \* \* \* \*